(12) United States Patent  
Lin et al.

(10) Patent No.: US 11,867,956 B2
(45) Date of Patent: Jan. 9, 2024

(54) OPTOELECTRONIC DEVICE

(71) Applicant: Advanced Semiconductor Engineering, Inc., Kaohsiung (TW)

(72) Inventors: Jr-Wei Lin, Kaohsiung (TW); Sin-Yuan Mu, Kaohsiung (TW); Chia-Sheng Cheng, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

(21) Appl. No.: 17/407,070

(22) Filed: Aug. 19, 2021

(65) Prior Publication Data

US 2023/0054600 A1 Feb. 23, 2023

(51) Int. Cl.
  *G02B 6/42* (2006.01)
  *G02B 6/12* (2006.01)
  *G02B 6/125* (2006.01)
  *G02B 6/43* (2006.01)
  *G02B 6/30* (2006.01)
  *G02B 6/02* (2006.01)
  *G02B 6/036* (2006.01)

(52) U.S. Cl.
  CPC ....... *G02B 6/4214* (2013.01); *G02B 6/12002* (2013.01); *G02B 6/125* (2013.01); *G02B 6/30* (2013.01); *G02B 6/4204* (2013.01); *G02B 6/4245* (2013.01); *G02B 6/43* (2013.01); *G02B 6/021* (2013.01); *G02B 6/02038* (2013.01); *G02B 6/02123* (2013.01); *G02B 6/036* (2013.01); *G02B 6/4256* (2013.01)

(58) Field of Classification Search
  CPC ............ G02B 6/12002; G02B 6/12004; G02B 2006/12104; G02B 6/125; G02B 6/12; G02B 6/122; G02B 6/43; G02B 6/4214; G02B 6/42; H05K 1/0274; H04B 10/801
  See application file for complete search history.

(56) References Cited

U.S. PATENT DOCUMENTS

| | | | | |
|---|---|---|---|---|
| 6,611,635 B1 * | 8/2003 | Yoshimura | ............... | H01L 24/96 257/E25.032 |
| 6,804,423 B2 * | 10/2004 | Tsukamoto | .......... | G02B 6/4214 385/35 |
| 7,062,117 B2 * | 6/2006 | Uchida | ................ | H05K 1/0274 385/14 |
| 7,421,858 B2 * | 9/2008 | Fukuzawa | ............ | G02B 6/4214 385/129 |

(Continued)

FOREIGN PATENT DOCUMENTS

EP 2112536 B1 * 10/2016 ............... G02B 6/43

OTHER PUBLICATIONS

Noriki, Akihiro et al., "45-degree curved micro-mirror for vertical optical I/O of silicon photonics chip", vol. 27, No. 14, Jul. 8, 2019, Optics Express, 9 pages.

*Primary Examiner* — Michelle R Connelly
(74) *Attorney, Agent, or Firm* — FOLEY & LARDNER LLP

(57) ABSTRACT

An optoelectronic device includes a photonic component. The photonic component includes an active side, a second side different from the active side, and an optical channel extending from the active side to the second side of the photonic component. The optical channel includes a non-gaseous material configured to transmit light.

18 Claims, 16 Drawing Sheets

(56) References Cited

U.S. PATENT DOCUMENTS

| | | | | |
|---|---|---|---|---|
| 7,437,030 B2* | 10/2008 | Asai | ................ | G02B 6/4204 |
| | | | | 257/E31.127 |
| 8,184,507 B1* | 5/2012 | Hirano | ................ | G11B 5/6088 |
| | | | | 369/112.27 |
| 9,094,135 B2* | 7/2015 | Pelley | ................ | H04B 10/801 |
| 10,663,746 B2 | 5/2020 | Chiang et al. | | |
| 11,611,004 B2* | 3/2023 | Amano | ................ | G02B 6/428 |
| 11,670,909 B2* | 6/2023 | Meister | ............. | G02B 6/12004 |
| | | | | 359/345 |
| 2002/0051599 A1* | 5/2002 | Tsukamoto | .......... | G02B 6/4214 |
| | | | | 385/14 |
| 2004/0109627 A1* | 6/2004 | Kim | ................ | G02B 6/43 |
| | | | | 385/14 |
| 2010/0202731 A1* | 8/2010 | Mitsumori | ............. | G02B 6/138 |
| | | | | 264/1.28 |
| 2011/0019960 A1* | 1/2011 | Matsubara | ........... | H05K 1/0274 |
| | | | | 385/14 |
| 2011/0076028 A1* | 3/2011 | Griebenow | ....... | H01L 31/02327 |
| | | | | 398/141 |
| 2012/0183009 A1* | 7/2012 | Adachi | ................ | G02B 6/4214 |
| | | | | 438/31 |
| 2014/0363172 A1* | 12/2014 | Pelley | ................ | H04B 10/801 |
| | | | | 398/141 |
| 2021/0033805 A1* | 2/2021 | Bishop | ................ | G02B 6/4268 |

* cited by examiner

OPTOELECTRONIC DEVICE

TECHNICAL FIELD

The present disclosure relates to an optoelectronic device and a method for manufacturing the same, and more particularly, to an optoelectronic device that includes an optical channel extending from an active side to a second side of a photonic component.

DESCRIPTION OF THE RELATED ART

The demand for network information has increased year by year for implementing cloud services, Internet of Things (IoT), 5G applications, etc. Such applications require high data transmission speed. While being operated at higher and higher speeds and frequencies, traditional cable transmission encounters signal integrity issues due to the high impedance generated by capacitance and inductance of traditional cables. Signal integrity issues limit the transmission distance and cause power loss of traditional cable transmission. In recent years, optical communication is often used to replace traditional cable transmission. In optical communication, optical fibers are used to replace electrically conductive wire between equipment. However, with continuously growing demand for higher speed and frequency, it is necessary to shorten the transmission distance of signal traces within equipment to avoid signal integrity issue at high speed.

One of the difficulties with optical communication products, such as optical transceivers or optical engines, developed with silicon photonics technology is to guide light or an optical signal from a waveguide in a silicon photonics device to an optical component, such as optical fiber. The size matching issues between the silicon photonics device and the optical component may result in energy loss of the light or optical signal. Therefore, the coupling of light or optical signals has become a key development issue, and it is important to improve units per hour (UPH) performance and lower cost.

SUMMARY

In some embodiments, an optoelectronic device includes a photonic component. The photonic component includes an active side, a second side different from the active side, and an optical channel extending from the active side to the second side of the photonic component. The optical channel includes a non-gaseous material configured to transmit light.

In some embodiments, an optoelectronic device includes a photonic component. The photonic component includes a first side, a second side different from the first side, and a first optical channel disposed along the first side of the photonic component. The photonic component further includes at least one second optical channel optically coupled to the first optical channel and extending to the second side of the photonic component.

In some embodiments, a method for manufacturing an optoelectronic device includes the following operations. A photonic component is provided. The photonic component has a first side and a second side different from the first side. The photonic component includes a first optical channel disposed along the first side of the photonic component. A portion of the photonic component is removed from the second side to form at least one pillar surrounded by a trench. The at least one pillar is optically coupled to the first optical channel. A cladding material is provided in the trench.

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
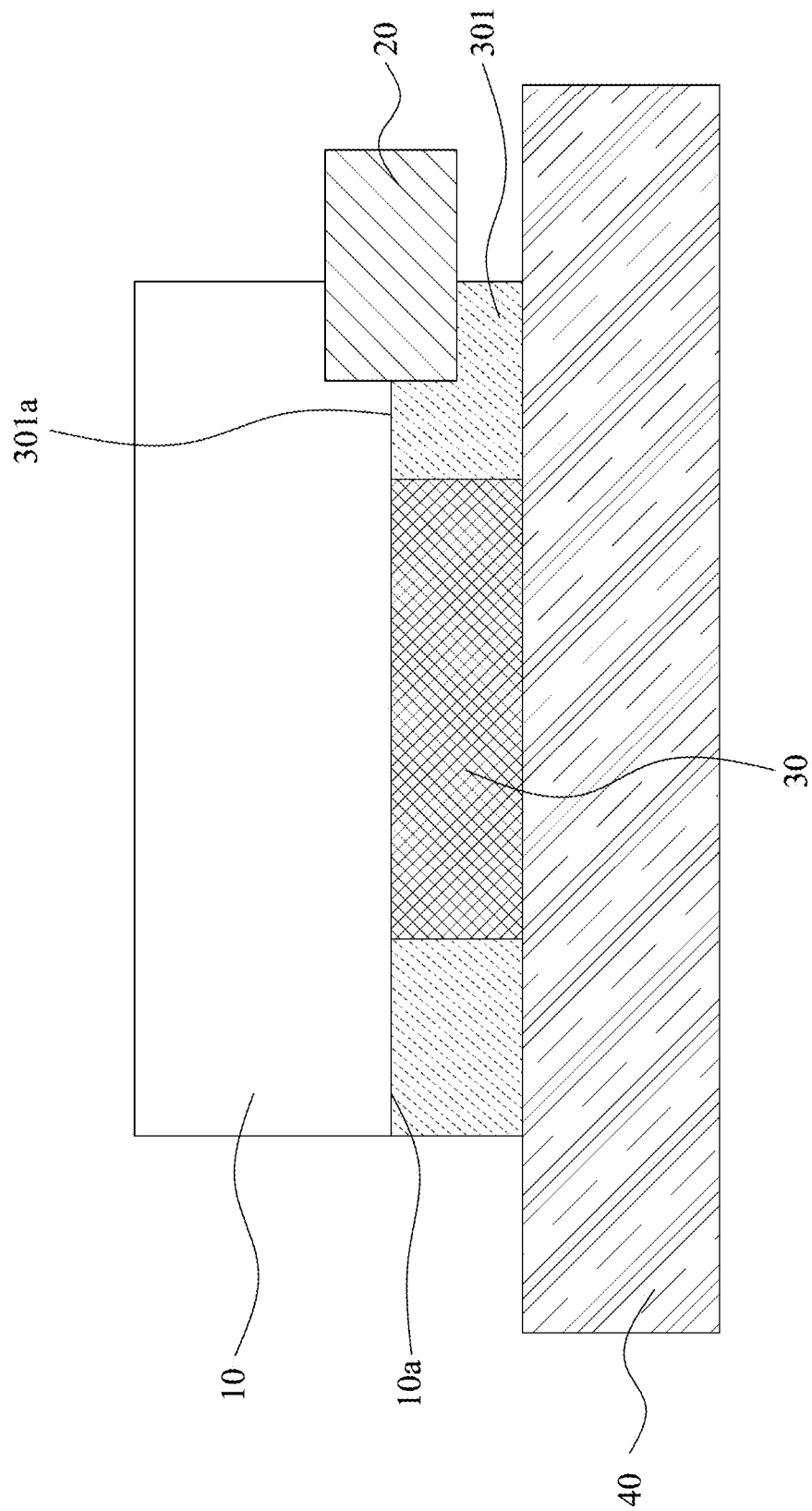
FIG. 1 illustrates a schematic cross-sectional view of an optoelectronic device in accordance with some comparative embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As used herein, the "active side" or "active surface" of a photonic component may refer to a side or a surface along which a waveguide is disposed and the waveguide may be disposed adjacent to the active side or the active surface. The "inactive side" or "inactive surface" of a photonic component may refer to a side or a surface along which no waveguide is disposed.

In an optoelectronic device, such as a high-speed optical communication product (e.g., an optical engine, including an optical transceiver, an optical receiver, or the like), according to some comparative embodiments of the present disclosure as illustrate in FIG. 1, an electronic component 30, such as an electronic die (also referred to as an electronic semiconductor die or an electronic integrated circuit (EIC) die), is disposed on a substrate 40. A photonic component 10, such as a photonic die (also referred to as a photonic semiconductor die or a photonic integrated circuit (PIC) die), is disposed on the electronic component 30. An active side or surface 10a of the photonic component 10 faces a surface 301a of a molding layer 301 covering the electronic component 30 (referred to as "a molding surface 301a of the electronic component 30). An optical component 20, such as a laser diode (LD) or a fiber array unit (FAU), is disposed between the electronic component 30 and the photonic component 10 and optically coupled to a waveguide located at the active side or surface 10a of the photonic component 10 (not shown). To manufacture such an optoelectronic device, the molding surface 301a of the electronic component 30 and the active surface 10a of the photonic component 10 need to be recessed to create a space for accommodating the optical component 20, since the optical component 20 is rather large (e.g., a thickness of the optical component 20 may be around 125 μm, while a thickness of the photonic component 10 may be around 200 μm). In the manufacturing process, the optical component 20 is first disposed in the recess of the photonic component 10, followed by attaching and electrically connecting the photonic component 10 to the electronic component 30. This manufacturing process is relatively complicated.

The present disclosure therefore provides an optoelectronic device and a method for manufacturing the optoelectronic device according to some embodiments. The optoelectronic device includes an optical channel extending from an active side to a second side of a photonic component. The second side is different from the active side. In some embodiments, the second side is opposite to the active side. The optical channel is configured to transmit light or an optical signal between the active side and the second side of the photonic component. Therefore, the optical component can be coupled to the second side of the photonic component. That is, it is possible to avoid disposing the optical component between the active side of the photonic component and the molding surface of the electronic component, and hence it is unnecessary to recess the active side of the photonic component or the molding surface of the electronic component. This makes it easier to integrate an optical component into the optoelectronic device and have more flexibility to design the optoelectronic device. In addition, the optoelectronic device allows for a process in which the optical component is disposed after the photonic component is attached and electrically connected to an electronic component. This process is relatively simple.

Figure 2:
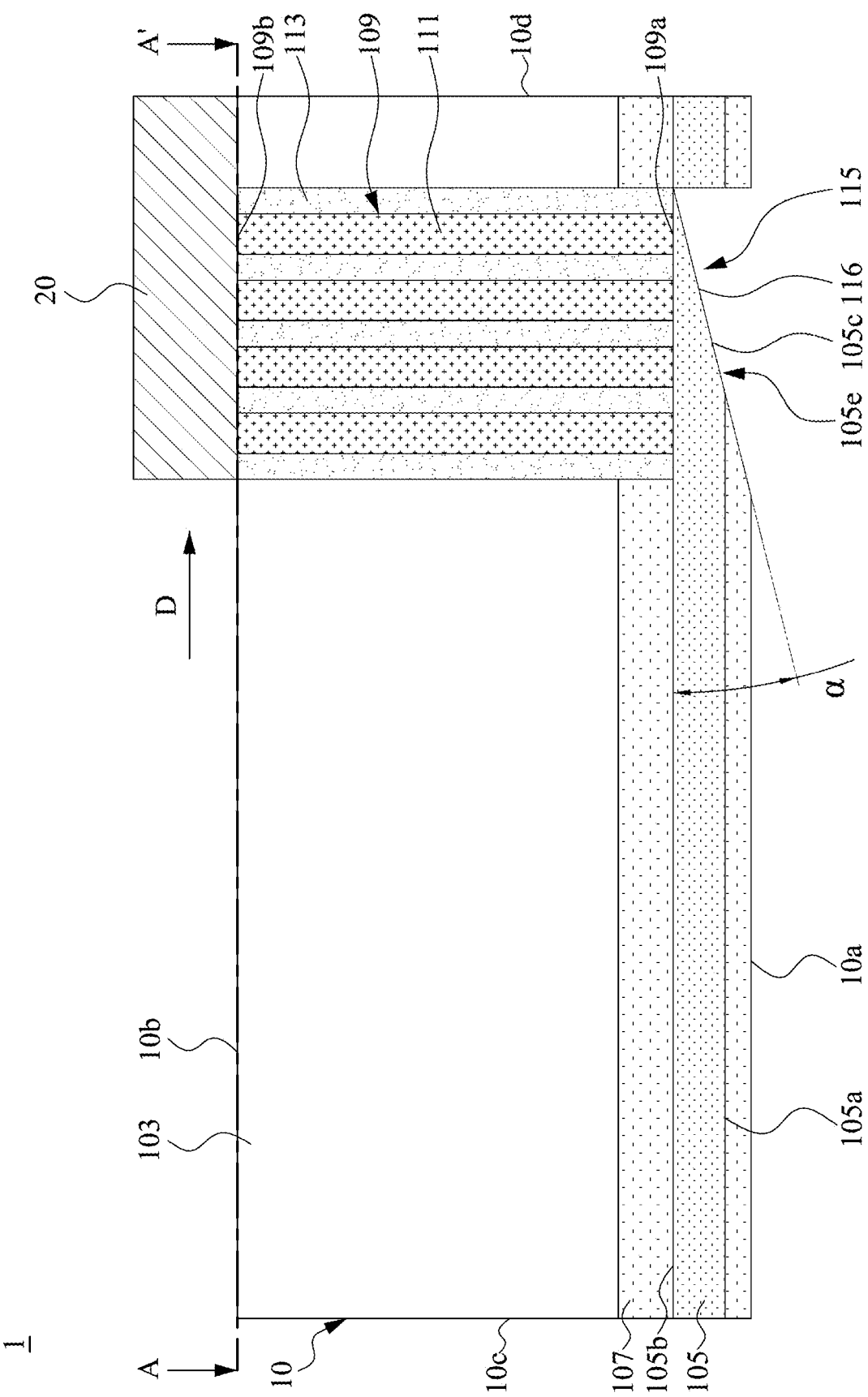
FIG. 2 illustrates a schematic cross-sectional view of an optoelectronic device in accordance with some embodiments of the present disclosure.
Figure 3A:
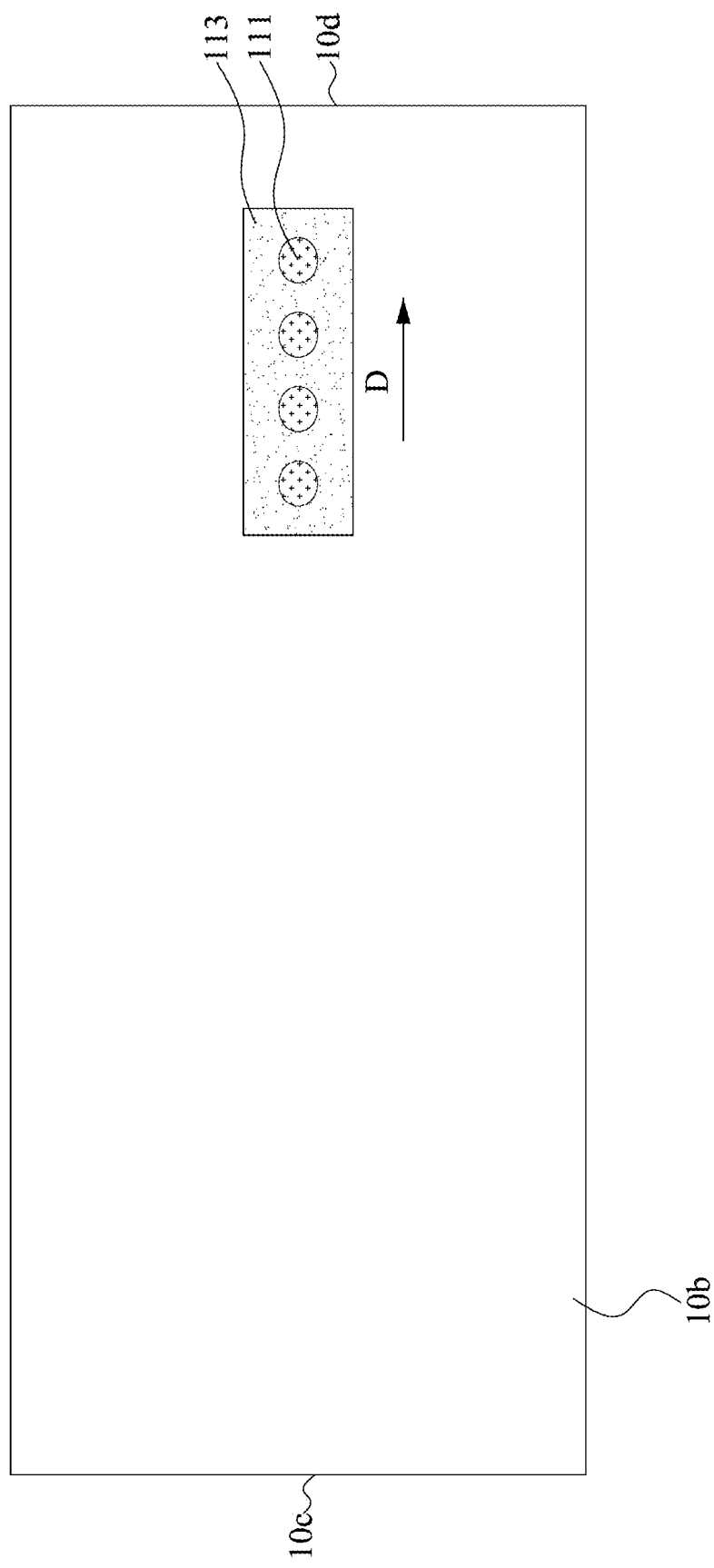
FIG. 3A and FIG. 3B illustrate top cross-sectional views of an optoelectronic device along line A-A' of FIG. 2 in accordance with some embodiments of the present disclosure.
Figure 3B:
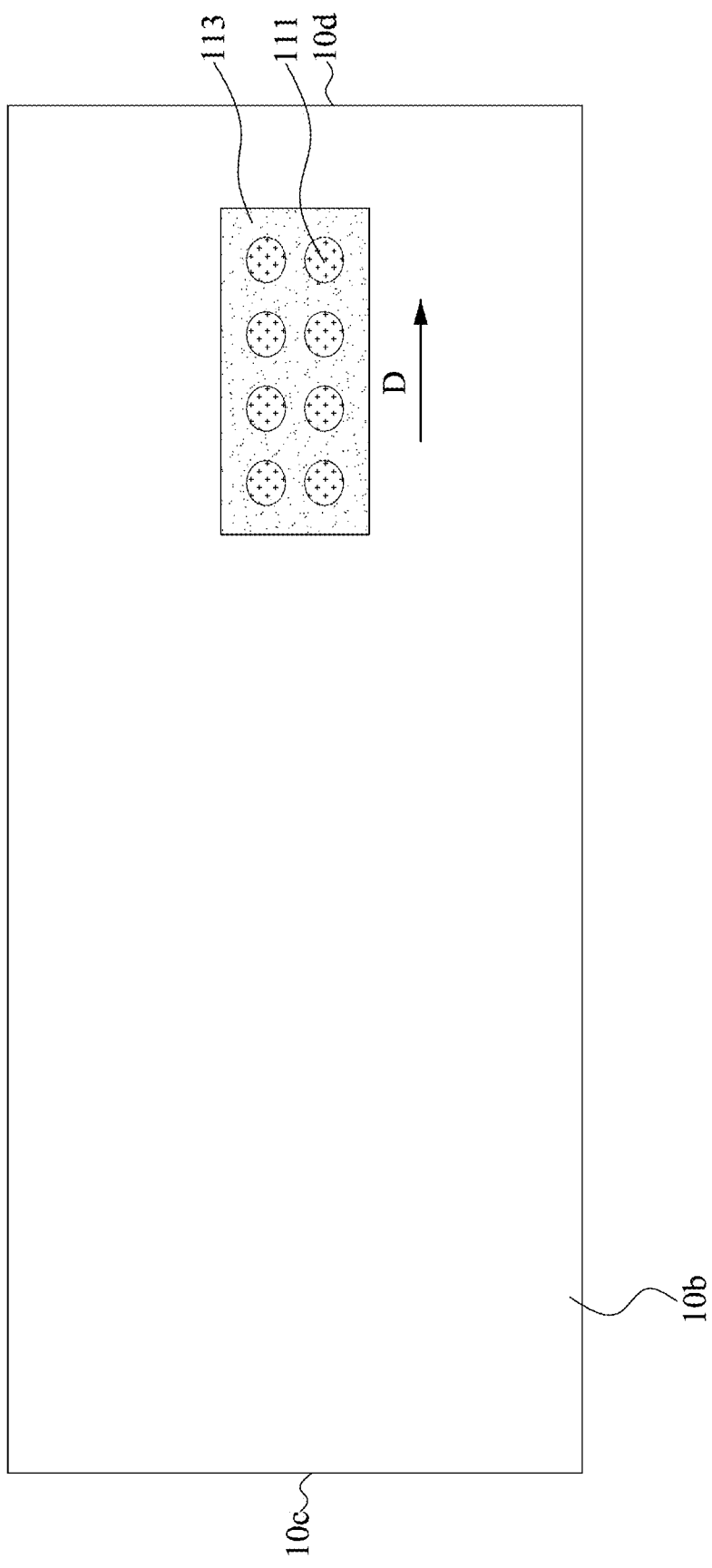
Figure 4:
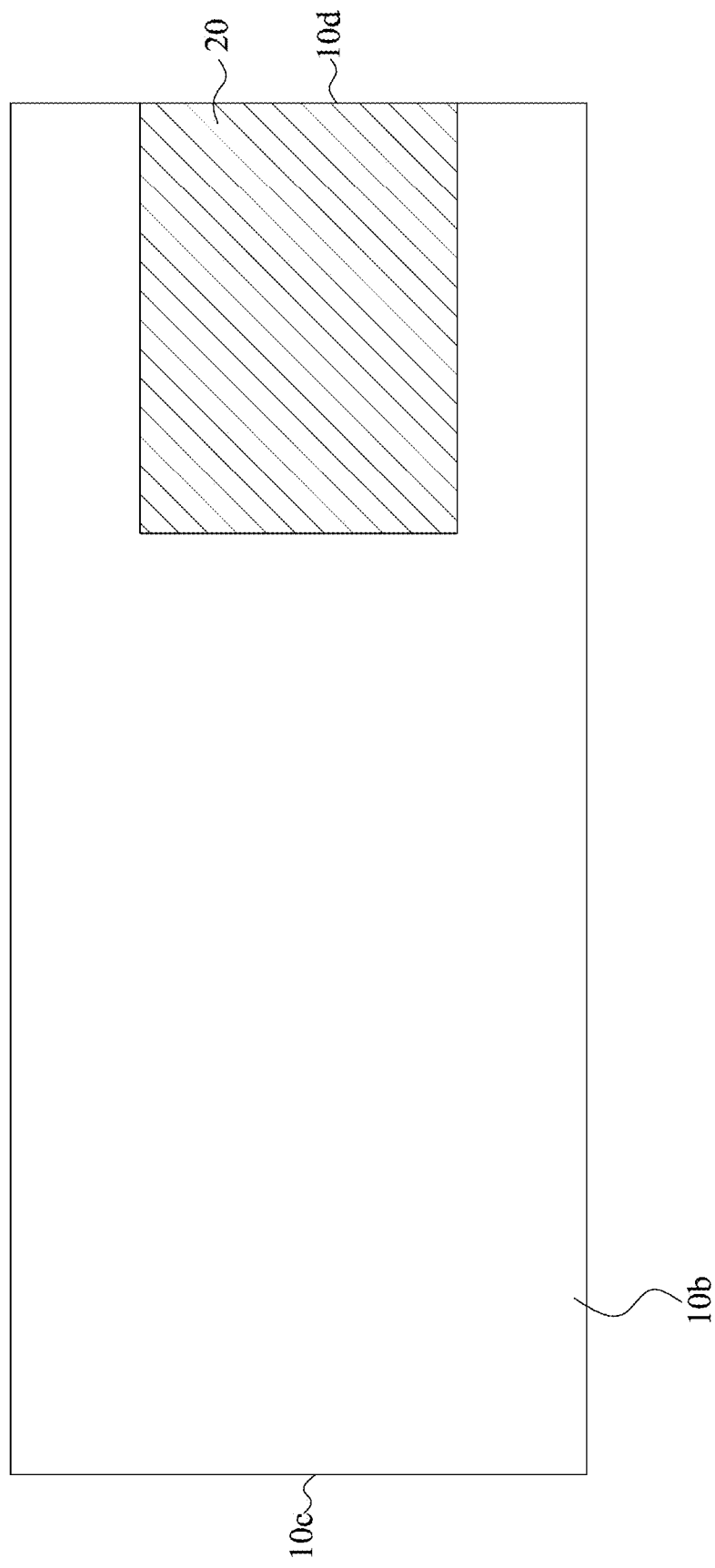
FIG. 4 illustrates a top view of an optoelectronic device in accordance with some embodiments of the present disclosure.

FIG. 2 illustrates a schematic cross-sectional view of an optoelectronic device 1 in accordance with some embodiments of the present disclosure. FIG. 3A and FIG. 3B illustrate top cross-sectional views of the optoelectronic device 1 along line A-A' of FIG. 2 in accordance with some embodiments of the present disclosure. FIG. 4 illustrates a top view of the optoelectronic device 1 in accordance with some embodiments of the present disclosure. In some embodiments, an optoelectronic device 1 includes a photonic component 10 having a first side and a second side. In some embodiments, the first side is an active side (e.g., 10a). In some embodiments, the second side is an inactive side (e.g., 10b, 10c or 10d). In some embodiments, the first side may be or includes an active surface. In some embodiments, the second side may be or includes an inactive surface. In some embodiments, the active surface and the inactive surface are located at different sides of the photonic component 10. The photonic component includes an optical channel 109 extending from the first side (10a) to the second side (10b, 10c or 10d) of the photonic component 10. The optical channel 109 includes a non-gaseous material configured to transmit light or an optical signal.

In some embodiments, the photonic component 10 has a first surface (also referred to as a lower surface) 10a, a second surface (also referred to as an upper surface) 10b, a first lateral surface 10c, and a second lateral surface 10d. The first surface constitutes the first side of the photonic component 10 and the second surface constitutes the second side of the photonic component 10, and therefore, the first surface 10a may be referred to as the first side 10a and the second surface 10b may be referred to as the second side 10b. The second surface 10b of the photonic component 10 is opposite to the first surface 10a of the photonic component 10. The first lateral surface 10c connects the first surface 10a and the second surface 10b. The second lateral surface 10d is opposite to the first lateral surface 10c and connects the first surface 10a and the second surface 10b. In some embodiments, the first surface 10a of the photonic component is an active surface. In some embodiments, the second surface 10b, the first lateral surface 10c, and/or the second lateral surface 10d of the photonic component 10 is an inactive surface. In some embodiments, the photonic component 10 includes a substrate 103, such as a semiconductor substrate, between the active surface (such as the first surface 10a) and the inactive surface (such as the second surface 10b). Examples of the semiconductor substrate include, but are not limited to, a silicon (Si) substrate.

In some embodiments, the photonic component 10 includes a first optical channel 105, such as an optical waveguide, disposed along the first surface 10a of the photonic component 10. The first optical channel 105 is adjacent to the first surface 10a of the photonic component 10. In some embodiments, the first optical channel 105 has a lower side 105a adjacent to the first surface 10a of the photonic component 10, an upper side 105b opposite to the lower side 105a, and a slope side 105c connecting the lower side 105a and the upper side 105b. The slope side 105c is inclined with respect to the lower side 105a, the upper side 105b, and also the first surface 10a of the optical component 10. The slope angle α formed by the upper side 105b and the slope side 105c of the first optical channel 105 is less than 90 degrees. The slope side 105c is configured to reflect light or an optical signal between the first optical channel 105 and the optical channel 109. That is, in some embodiments, the slope side 105c of the first optical channel 105 functions as a reflector and is referred to as a reflective surface. In some embodiments, the first optical channel 105 includes silicon, silicon nitride, or the like.

The photonic component 10 further includes a first cladding layer 107 around the first optical channel 105. The first cladding layer 107 has a refractive index smaller than a refractive index of the first optical channel 105. In some embodiments, the first cladding layer 107 is configured to confine light or an optical signal in the first optical channel 105. In some embodiments, the first cladding layer 107 is configured to protect first optical channel 105 and may be referred to as a protective layer. In some embodiments, the first cladding layer 107 contains an inorganic material, such as an oxide material, e.g., silicon oxide, or the like.

The optical channel 109 includes a medium for transmission of light or an optical signal. The optical channel 109 is configured to transmit light or an optical signal between the active side or surface (such as 10a) and the inactive side or surface (such as 10b, 10c or 10d) of the photonic component 10. In some embodiments, the optical channel 109 has a continuous structure, such as a channel structure which may be straight, curved, bended, or the like, and a cross-section thereof may be circular, oval, polygonal (such as tetragonal or hexagonal), or the like. In some embodiments, the optical channel has a discontinuous structure, such as an array of dots (e.g., spheres, ovals, or the like). In some embodiments, the optical channel 109 is disposed across or through at least a portion of the photonic component 10. For example, the optical channel 109 may be disposed across or through at least a portion of the substrate 103 of the photonic component 10. In some embodiments, the optical channel 109 has an end 109a adjacent to the active surface of the photonic component 10 and embedded in the photonic component 10. In some embodiments, the optical channel 109 has an end 109b exposed from the inactive surface of the photonic component 10. In some embodiments, the non-gaseous material of the optical channel 109 is the same as a substrate material of the photonic component 10 (i.e., the material of the substrate 103). For example, the non-gaseous material of the optical channel 109 and the substrate material of the photonic component 10 both include a same semiconductor material, such as silicon. In some embodiments, the non-gaseous material of the optical channel 109 is the same as a material of the first optical channel 105. For example, the optical channel 109 and the first optical channel 105 may both include a same material, such as silicon. In other embodiments, the non-gaseous material of the optical channel 109 is different from a material of the first optical channel 105. For example, the optical channel 109 may include a material, such as silicon, while the first optical channel 105 may include a different material, such as silicon nitride. In some embodiments, the non-gaseous material of the optical channel 109 is a solid material.

In some embodiments, the optical channel 109 may include a plurality of channel structures, such as a plurality of second optical channel structures 111 as shown in FIG. 2, FIG. 3A and FIG. 3B. The second optical channel structures 111 may be referred to as the second optical channel 111 for brevity in the present disclosure. The plurality of second optical channels 111 are embedded in the second cladding layer 113. In some embodiments, the plurality of second optical channels 111 are arranged parallel to each other as shown in FIG. 2, FIG. 3A and FIG. 3B. In some embodiments, the plurality of second optical channels 111 are arranged in sequence in a direction D from the first lateral surface 10c to the second lateral surface 10d as shown in FIG. 2, FIG. 3A and FIG. 3B. The number of second optical channels 111 is not particularly limited, and can be for example, 4, 8, 12, 16, 24, 32, 36 or more. In some embodiments, the number of second optical channels 111 is determined for optimization of an efficiency of transmitting light or an optical signal from the first optical channel to the second optical channels or from the second optical channels to the first optical channel. In some embodiments, as compared to a single second optical channel 111, a plurality of second optical channels 111 allow for higher tolerance for alignment with an optical component 20, such as an optical fiber, and enhance a yield of optical coupling with the optical component 20. The layout of the plurality of second optical channels 111 is not particularly limited. In some examples as shown in FIG. 3A, the plurality of second optical channels 111 may be arranged in a single row in the direction D. In other examples as shown in FIG. 3B, the plurality of second optical channels 111 may be arranged in two or more rows in the direction D. The geometry or shape of the second optical channels 111 is not particularly limited. In some embodiments, the second optical channels 111 have a uniform width or diameter as illustrated in FIG. 2. In some embodiments, a size (e.g., width or diameter) of the second optical channels 111 may vary. For example, a size (e.g., width or diameter) of the second optical channels 111 may increase from the inactive surface (e.g., 10b) to the active surface (e.g., 10a) of the photonic component 10.

The photonic component 10 further includes a second cladding layer 113 around the optical channel 109. The second cladding layer 113 has a refractive index smaller than a refractive index of the optical channel 109. In some embodiments, the second cladding layer 113 is configured to confine light or an optical signal in the optical channel 109. In some embodiments, the second cladding layer 113 is configured to protect the optical channel 109 and may be referred to as a protective layer. In some embodiments, a material of the second cladding layer 113 is the same as a material of the first cladding layer 107. In some other embodiments, a material of the second cladding layer 113 is different from a material of the first cladding layer 107. In some embodiments, the second cladding layer 113 contains an organic material. In some embodiments, the second cladding layer 113 contains a polymeric material, such as epoxy-based resin or the like. In some embodiments, the second cladding layer 113 is more moisture absorptive than the optical channel 109. Therefore, when the photonic component 10 is intruded by moisture, the second cladding layer 113 can help to hinder moisture from diffusing into the optical channel 109 or further to the active surface 10a of the photonic component 10, thereby improving performance of the photonic component 10.

In some embodiments, the optoelectronic device 1 includes an optical component 20 on the inactive surface of the photonic component 10. The optical component 20 is optically coupled to the optical channel 109 and configured to transmit light or an optical signal between the optical channel 109 and the optical component 20. The optical component 20 may be an active component or a passive component. In some embodiments, the optical component 20 includes an optical fiber, a laser diode, or the like. In some embodiments, the optical component is a fiber array unit (FAU). In some embodiments as shown in FIG. 4, from a top view, the optical component 20 covers the plurality of second optical channels 111 and the second cladding layer 113.

In other words, in some embodiments as shown in FIG. 2, an optoelectronic device 1 includes a photonic component 10 having a first side 10a and a second side (e.g., 10b, 10c or 10*d*). The photonic component 10 includes a first optical channel 105 disposed along the first side 10*a* of the photonic component 10. The photonic component 10 further includes at least one second optical channel 111 optically coupled to or connected to the first optical channel 105 and extending to the second side (e.g., 10*b*, 10*c* or 10*d*) of the photonic component 10. The at least one second optical channel 111 is configured to transmit light or an optical signal from the first optical channel 105 to the second side of the photonic component 10 or from the second side of the photonic component 10 to the first optical channel 105. In some embodiments, the at least one second optical channel 111 is substantially perpendicular to the first optical channel 105. In some embodiments, the first side 10*a* of the photonic component 10 may be or include an active surface, and the second side 10*b*, 10*c* or 10*d* of the photonic component may be or include an inactive surface. In some embodiments, the photonic component includes a plurality of the second optical channels 111. In some embodiments, the plurality of second optical channels 111 are arranged parallel to each other. In some embodiments, the plurality of second optical channels 111 are arranged in sequence in a direction D from the first lateral surface 10*c* to the second lateral surface 10*d* as shown in FIG. 2, FIG. 3A and FIG. 3B. In some embodiments, the plurality of second optical channels 111 are embedded in a second cladding layer 113. In some embodiments, the optoelectronic device 1 further includes an optical component 20 disposed on the second surface of the photonic component 10. The optical component 20 is optically coupled to or connected to the at least one second optical channel 111.

In some embodiments, the photonic component 10 includes a reflective surface 105*c* located at an end 105*e* of the first optical channel 105 as shown in FIG. 2, wherein the end 105*e* of the first optical channel 105 is located adjacent to the at least one second optical channel 111. In some embodiments, the end 105*e* of the first optical channel 105 is located below the at least one second optical channel 111. The reflective surface 105*c* is inclined with respect to the first surface 10*a* of the photonic component 10. The reflective surface 105*c* is configured to reflect light or an optical signal from the first optical channel 105 to the at least one second optical channel 111 or from the at least one second optical channel 111 to the first optical channel 105. In some embodiments, the photonic component 10 includes a recess 115 at the first surface 10*a* of the photonic component 10. The recess 115 has an interface 116 with the first optical channel 105. The interface 116 constitutes or functions as the reflective surface. In some embodiments, the recess 115 has a wedge shape. In some embodiments, the recess 115 is filled with air, an oxide material, a polymeric material, or the like. A material filled in the recess 115 has a refractive index smaller than a refractive index of the first optical channel 105.

Figure 5A:
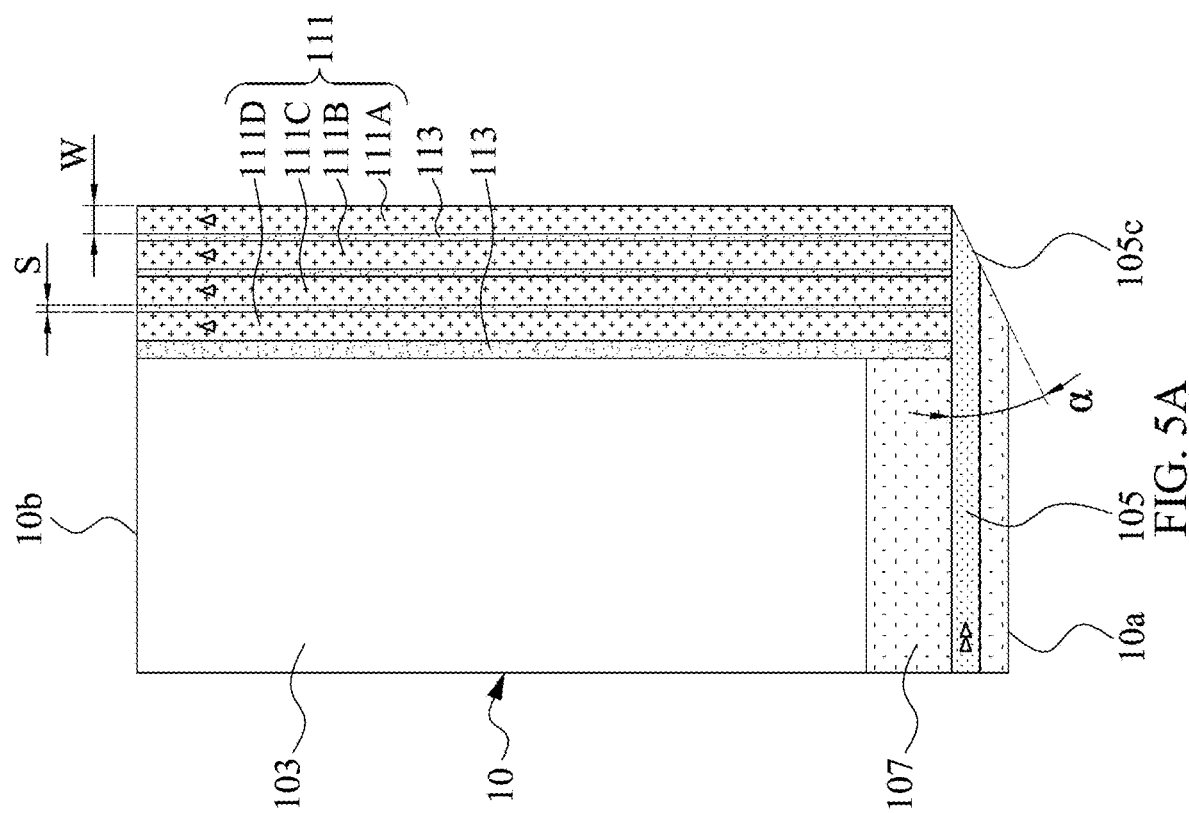
FIG. 5A illustrates a schematic cross-sectional view of a portion of an optoelectronic device in accordance with some embodiments of the present disclosure.
Figure 5B:
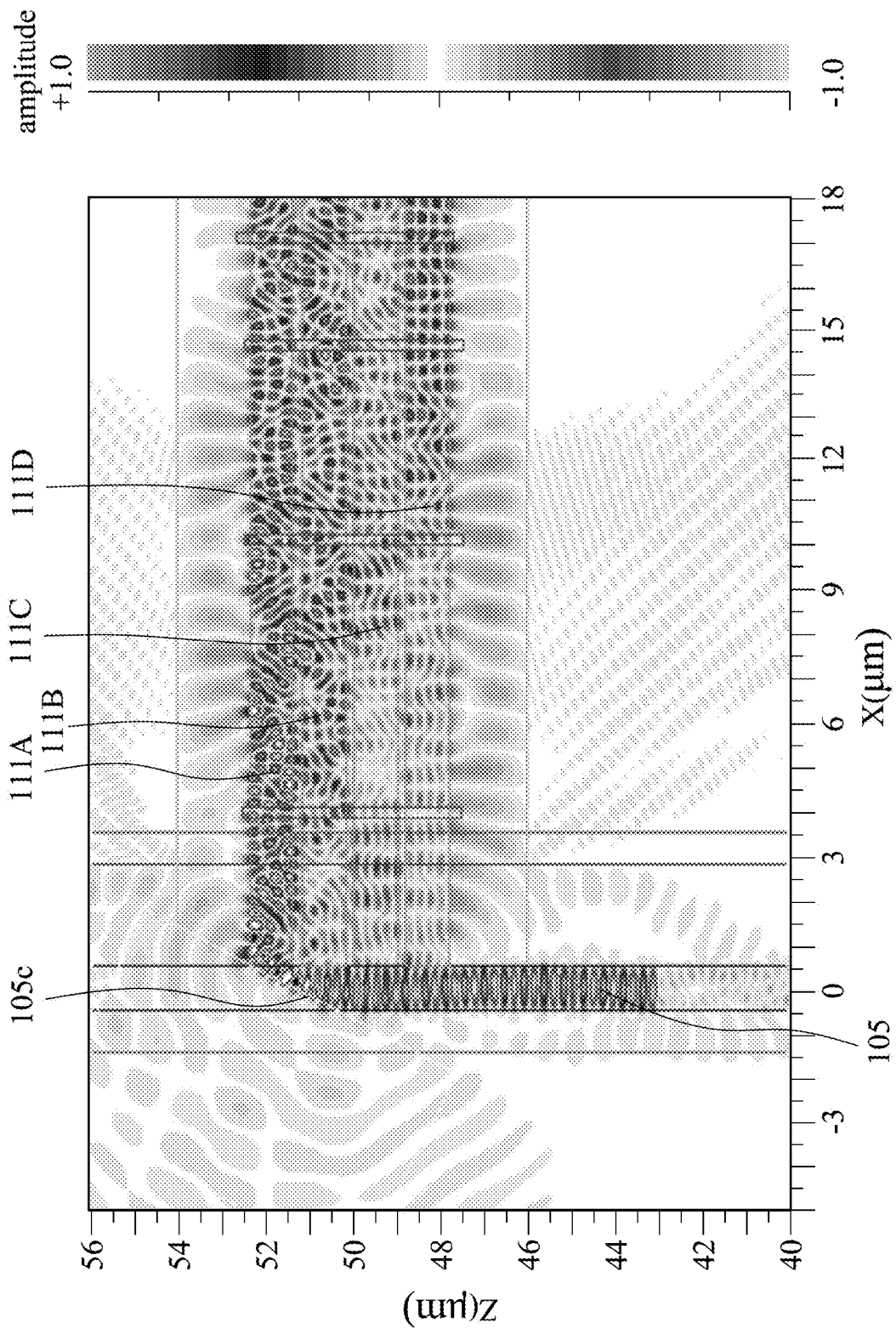
FIG. 5B and FIG. 5C show simulation results of a portion of an optoelectronic device of FIG. 5A in accordance with some embodiments of the present disclosure.
Figure 5C:
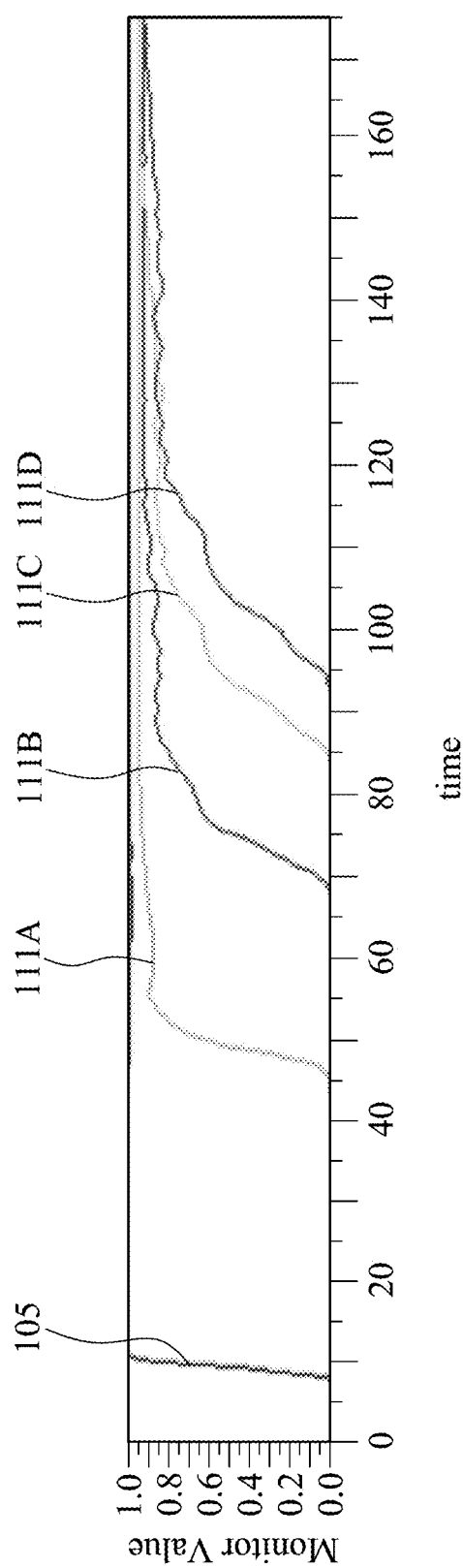

FIG. 5A illustrates a schematic cross-sectional view of a portion of the optoelectronic device 1 in accordance with some embodiments of the present disclosure. The optoelectronic device 1 includes a plurality of second optical channels 111. As shown in FIG. 5A, the optoelectronic device 1 includes four second optical channels 111A, 111B, 111C and 111D. However, as discussed above, the number of second optical channels 111 is not particularly limited and can be determined for optimization of an efficiency of light transmission. The plurality of second optical channels 111A, 111B, 111C or 111D have a width W for one second optical channel and a spacing S between adjacent second optical channels 111. In some embodiments, the width W and the spacing S of the second optical channels 111 and the slope angle α of the reflective surface 105*c* can be adjusted to have an optimal output of light or an optical signal from the plurality of second optical channels 111. In some embodiments, the width W, the spacing S and the slope angle α can be adjusted to have a relatively uniform distribution of light or an optical signal among the plurality of second optical channels 111A, 111B, 111C and 111D. In some embodiments, the width W of the second optical channel 111 is equal to or larger than a width of the first optical channel 105, so that the light or optical signal can be better transmitted from the first optical channel 105 to the second optical channel 111. In some embodiments, the first optical channel 105, such as waveguide, has a width of around 0.25 μm to 1 μm (e.g., 0.25 μm, 0.3 μm, 0.4 μm, 0.5 μm, 0.6 μm, 0.7 μm, 0.8 μm, 0.9 μm or 1 μm). In some embodiments, the spacing S is around 0.1 μm to around 0.5 μm (e.g., 0.1 μm, 0.2 μm, 0.3 μm, 0.4 μm or 0.5 μm). In some embodiments, the spacing S is larger than 0.2 μm. In some embodiments, the spacing S is around 0.25 μm. In some embodiments, with the use of larger spacing S, the optical coupling effect can be enhanced. In some embodiments, the upper limit of the spacing S is determined based on the optical coupling effect. In some embodiments, the slope angle α is determined depending on the number, the width W and the spacing S of the second optical channels 111. In some embodiments, the slope angle α is less than 90 degrees (e.g., 80 degrees, 70 degrees, 60 degrees, 50 degrees, 40 degrees, 30 degrees, 25 degrees, 20 degrees, 15 degrees or 10 degrees). In some embodiments, the slope angle α is between 25 and 50 degrees. In some embodiments, the slope angle α is between 30 and 50 degrees. In some embodiments, the width W is around 1 μm, the spacing S is around 0.25 μm and the slope angle α is around 25 degrees. FIG. 5B and FIG. 5C show simulation results, e.g., by Rsoft, of a portion of an optoelectronic device 1 of FIG. 5A in accordance with some embodiments of the present disclosure. FIG. 5B shows distribution of light in the first optical channel 105 and the second optical channels 111A, 111B, 111C and 111D. FIG. 5C shows detection of the light in the first optical channel 105 and the second optical channels 111A, 111B, 111C and 111D versus time. As shown in FIG. 5B and FIG. 5C, the light can be transmitted from the first optical channel 105 to the second optical channels 111A, 111B, 111C and 111D. The second optical channel 111A is closest to the slope side 105*c* of the first optical channel 105, followed by the second optical channels 111B, the second optical channels 111C and the second optical channels 111D. With the use of a plurality of the second optical channels, a portion (or most) of the reflected light may enter one of the second optical channels (e.g., 111A), and the remaining of the reflected light may enter the remaining of the second optical channels (e.g., 111B, 111C and/or 111D). In addition, in some embodiments, the light entering the second optical channel (111A, 111B, 111C or 111D) may not be fully confined in the second optical channel by the cladding layer, and thus causing the loss of light. However, with the use of the plurality of the second optical channels, the optical transmission efficiency can be enhanced since the second optical channels can be optically coupled with each other to transmit the light from another second optical channel. That is, one of the second optical channels 111A, 111B, 111C and 111D can receive the light from another one of the second optical channels 111A, 111B, 111C and 111D. Taking the embodiments shown in FIG. 5B as an example, it can be observed that the light from the first optical channel 105 is transmitted to the second optical channel 111A at around X=0.5 μm; the second optical channel 111B receives the light from another second optical channel (e.g., 111A) significantly at around X=3.5 μm; the second optical channel 111C receives the light from another second optical channel (e.g., 111B) significantly at around X=7.5 μm; and the second optical channel 111D receives the light from another second optical channel (e.g., 111C) significantly at around X=10 μm. In some embodiments, it is found that more than 80% of the light can be transmitted from the active surface to the inactive surface of the photonic component 10 by the use of a plurality of the second optical channels 111A, 111B, 111C and 111D. In some embodiments, as compared to a single second optical channel, a plurality of second optical channels, such as 111A, 111B, 111C and 111D, enhance the optical transmission efficiency.

Figure 6:
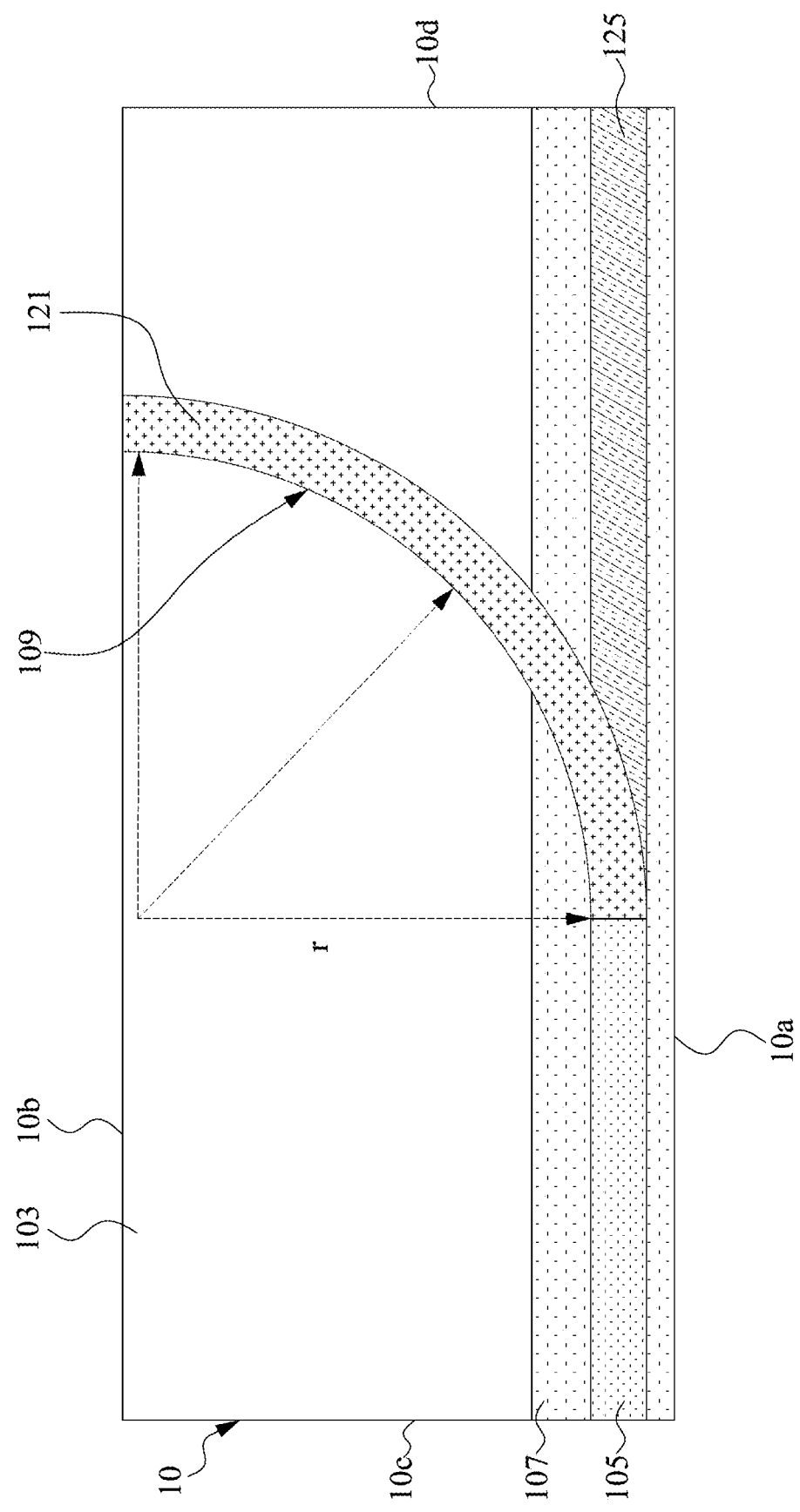
FIG. 6 illustrates a schematic cross-sectional view of an optoelectronic device in accordance with some embodiments of the present disclosure.

FIG. 6 illustrates a schematic cross-sectional view of an optoelectronic device 2 in accordance with some embodiments of the present disclosure. The optoelectronic device 2 is similar to the optoelectronic device 1 as described and illustrated with reference to FIG. 2, except that the optical channel 109 includes a curved optical channel structure 121 extending from the active side, such as the first surface 10a, to the second side, such as the second surface 10b, of the photonic component 10. The curved optical channel 121 is optically coupled to or connected to the first optical channel 105 and extends to the second surface 10b of the photonic component 10. The photonic component 10 further includes a reflective structure 125 having an interface with the curved optical channel 121. The reflective structure 125 has a lower refractive index than the curved optical channel 121. The interface between the reflective structure 125 and the curved optical channel 121 constitutes or functions as a reflective surface for reflecting light or an optical signal to the curved optical channel 121. In some embodiments, the curved optical channel 121 includes a plurality of segments arranged to collectively form a curve structure. In some embodiments, a curvature radius r of the curved optical channel 121 is more than 30 μm. In some embodiments, a size (e.g., thickness or width) of the curved optical channel 121 is equal to or larger than a size (e.g., thickness or width) of the first optical channel 105.

Figure 7:
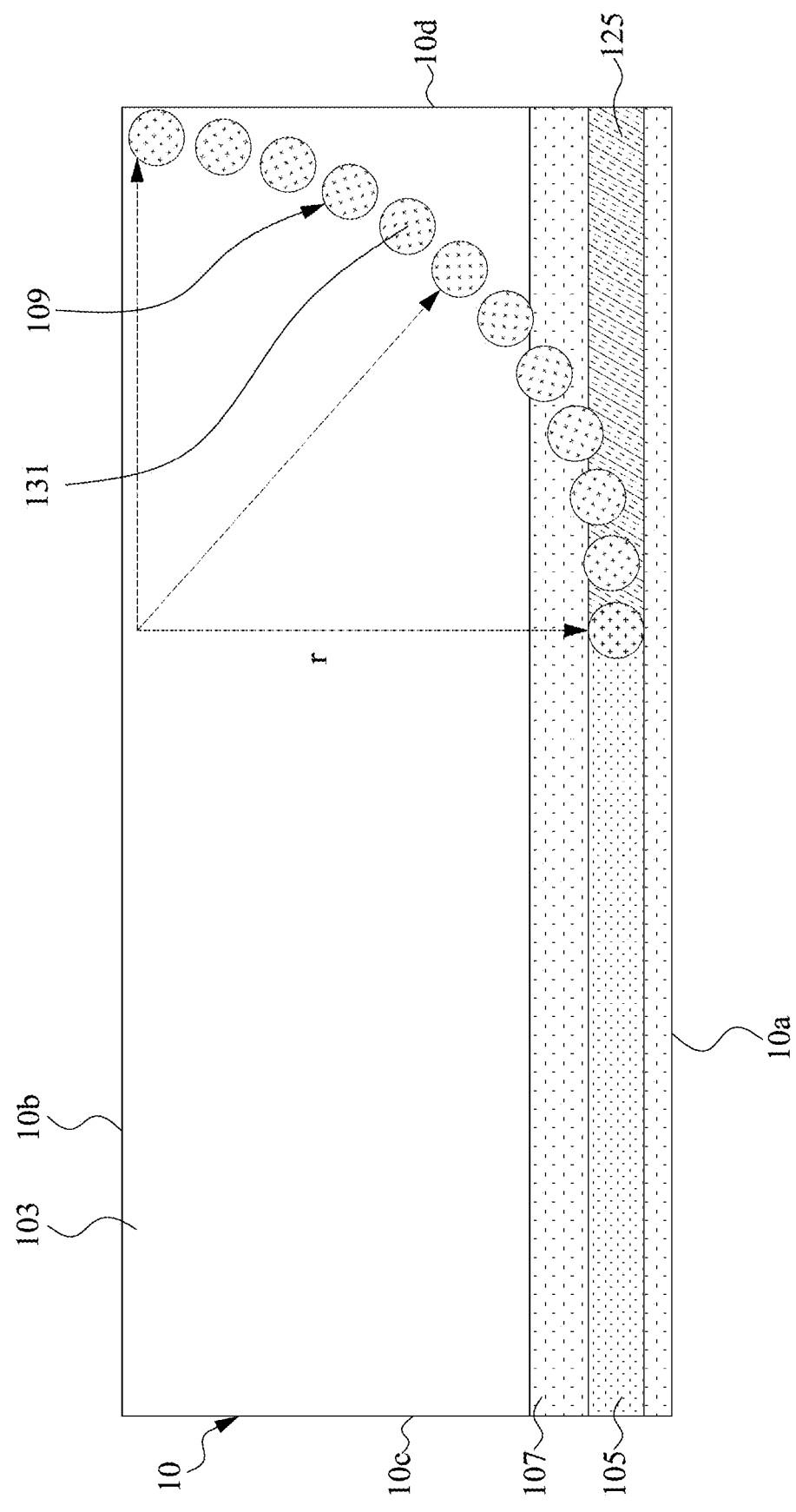
FIG. 7 illustrates a schematic cross-sectional view of an optoelectronic device in accordance with some embodiments of the present disclosure.

FIG. 7 illustrates a schematic cross-sectional view of an optoelectronic device 3 in accordance with some embodiments of the present disclosure. The optoelectronic device 3 is similar to the optoelectronic device 2 as described and illustrated with reference to FIG. 6, except that the optical channel 109 includes a plurality of discontinuous structures 131 optically coupling with one another and configured to transmit light or an optical signal. In some embodiments, the discontinuous structures 131 include an array of dots (e.g., spheres, ovals, or the like). In some embodiments, the discontinuous structures 131 are arranged to collectively form a curve structure. In some embodiments, a curvature radius r of the curve structure is more than 30 μm.

Figure 8:
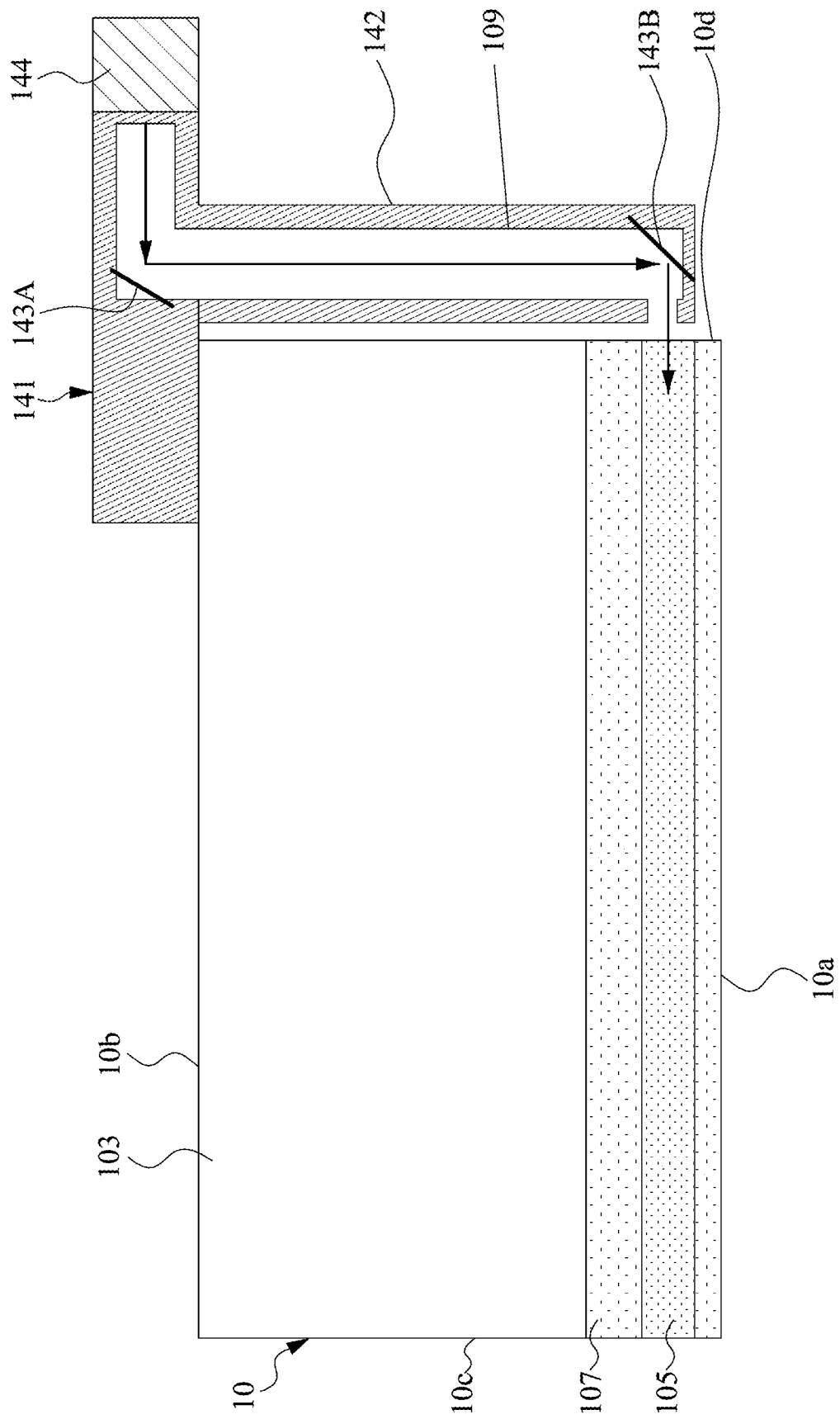
FIG. 8 illustrates a schematic cross-sectional view of an optoelectronic device in accordance with some embodiments of the present disclosure.

FIG. 8 illustrates a schematic cross-sectional view of an optoelectronic device 4 in accordance with some embodiments of the present disclosure. The optoelectronic device 4 is similar to the optoelectronic device 1 as described and illustrated with reference to FIG. 1, except that the optical channel 109 is included in a housing 142 of an optical component 141, such as a fiber array unit (FAU), the housing 142 of the optical component 141 extending from the active surface (such as the first surface 10a) to the inactive surface (such as the second surface 10b) of the photonic component 10. The optical component 141 may include a pair of reflectors 143A, 143B. The optical component 141 is optically coupled to the first optical channel 105 at an end near the first surface 10a of the photonic component 10 and optically coupled to an optical fiber 144 at another end near the second surface 10b of the photonic component 10. The reflector 143A is configured to reflect light or an optical signal from or into the optical fiber 144. The reflector 143B is configured to reflect light or an optical signal from or into the first optical channel 105.

Figure 9:
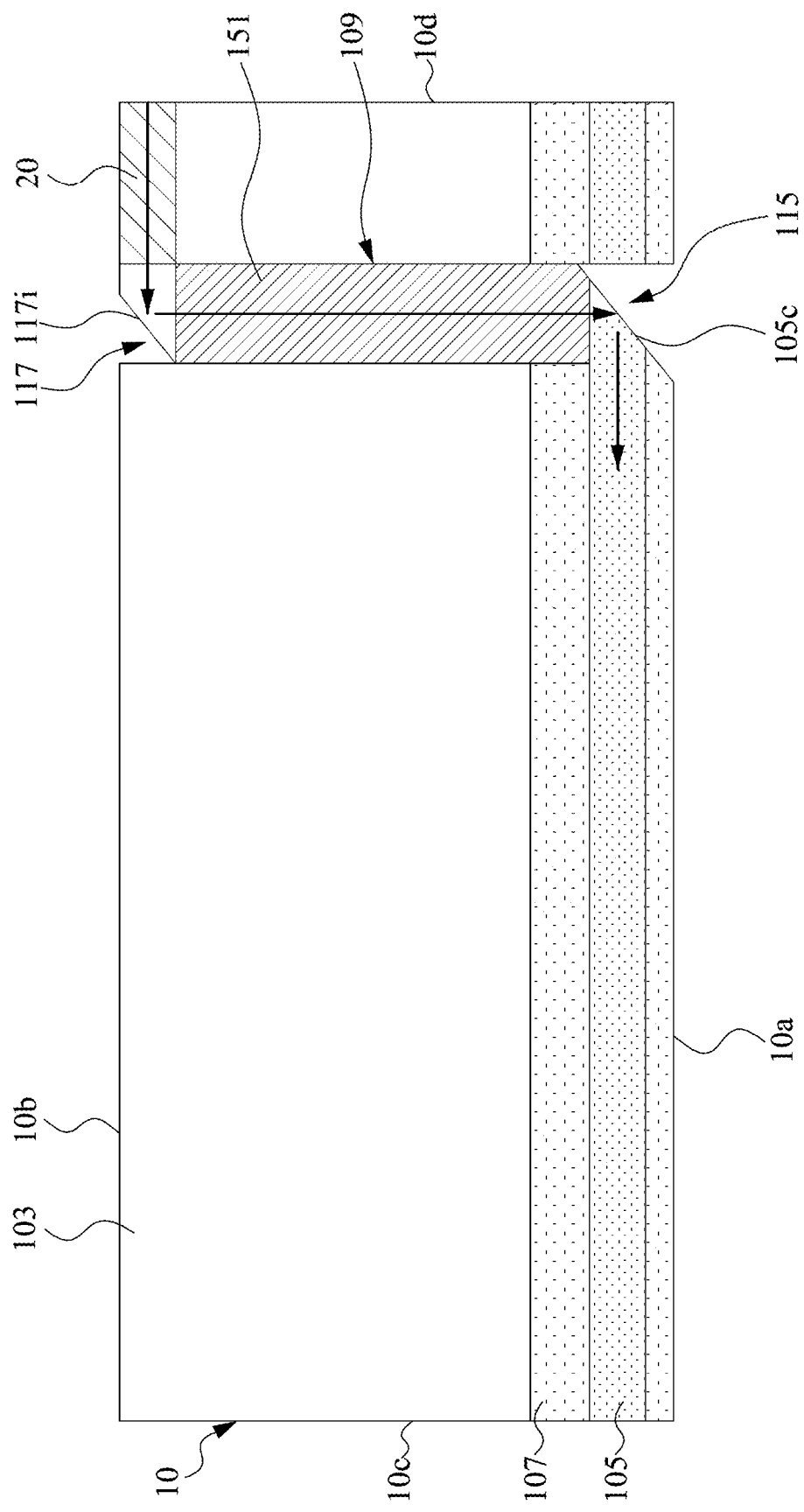
FIG. 9 illustrates a schematic cross-sectional view of an optoelectronic device in accordance with some embodiments of the present disclosure.

FIG. 9 illustrates a schematic cross-sectional view of an optoelectronic device 5 in accordance with some embodiments of the present disclosure. The optoelectronic device 5 is similar to the optoelectronic device 1 as described and illustrated with reference to FIG. 2, except that the photonic component 10 further includes a second recess 117 at the second surface 10b. The optical channel 109 includes an optical channel structure 151 which, in some embodiments, is similar to the second optical channel 111 surrounded by the second cladding layer 113 as described above. The second recess 117 has an interface 117i with the substrate 103 of the photonic component 10. The interface 117i is inclined with respect to the second surface 10b of the photonic component 10. The interface 117i functions as a reflector and is configured to reflect a light or an optical signal from the optical component 20 to the optical channel 151 or reflect a light or an optical signal from the optical channel 151 to the optical component 20.

Figure 10:
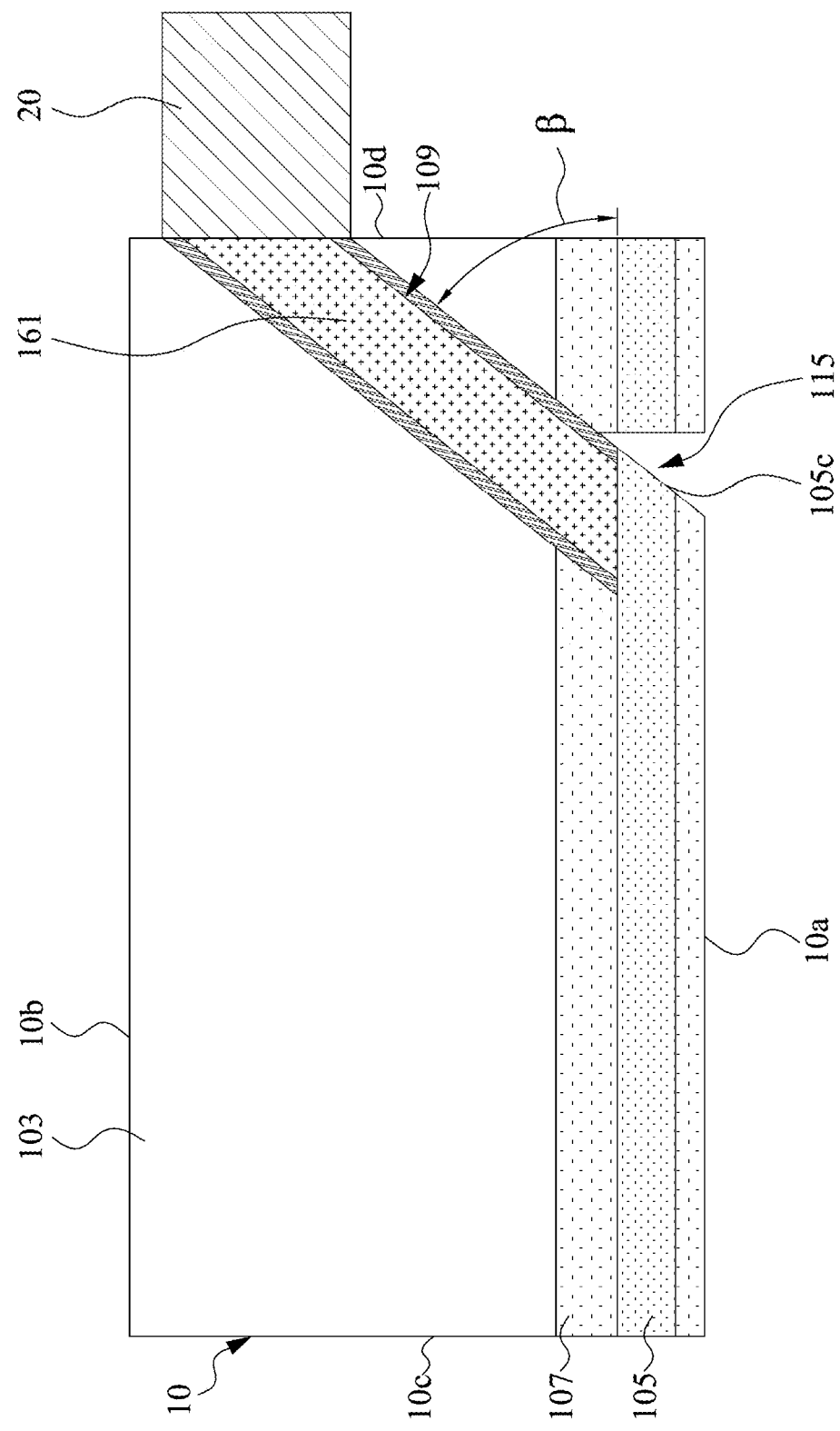
FIG. 10 illustrates a schematic cross-sectional view of an optoelectronic device in accordance with some embodiments of the present disclosure.

FIG. 10 illustrates a schematic cross-sectional view of an optoelectronic device 6 in accordance with some embodiments of the present disclosure. The optoelectronic device 6 is similar to the optoelectronic device 1 as described and illustrated with reference to FIG. 2, except that the optical channel 109 includes an inclined optical channel 161 extending from the first surface 10a to the second lateral surface 10d of the photonic component 10. The optical channel 161 is inclined with respect to the first optical channel 105 by an angle β which is smaller than 90°. In the case that the angle β is equal to 90°, the optical channel 161 extends from the first surface 10a to the second surface 10b of the photonic component 10 as the second optical channels 111 illustrated in FIG. 2.

Figure 11A:
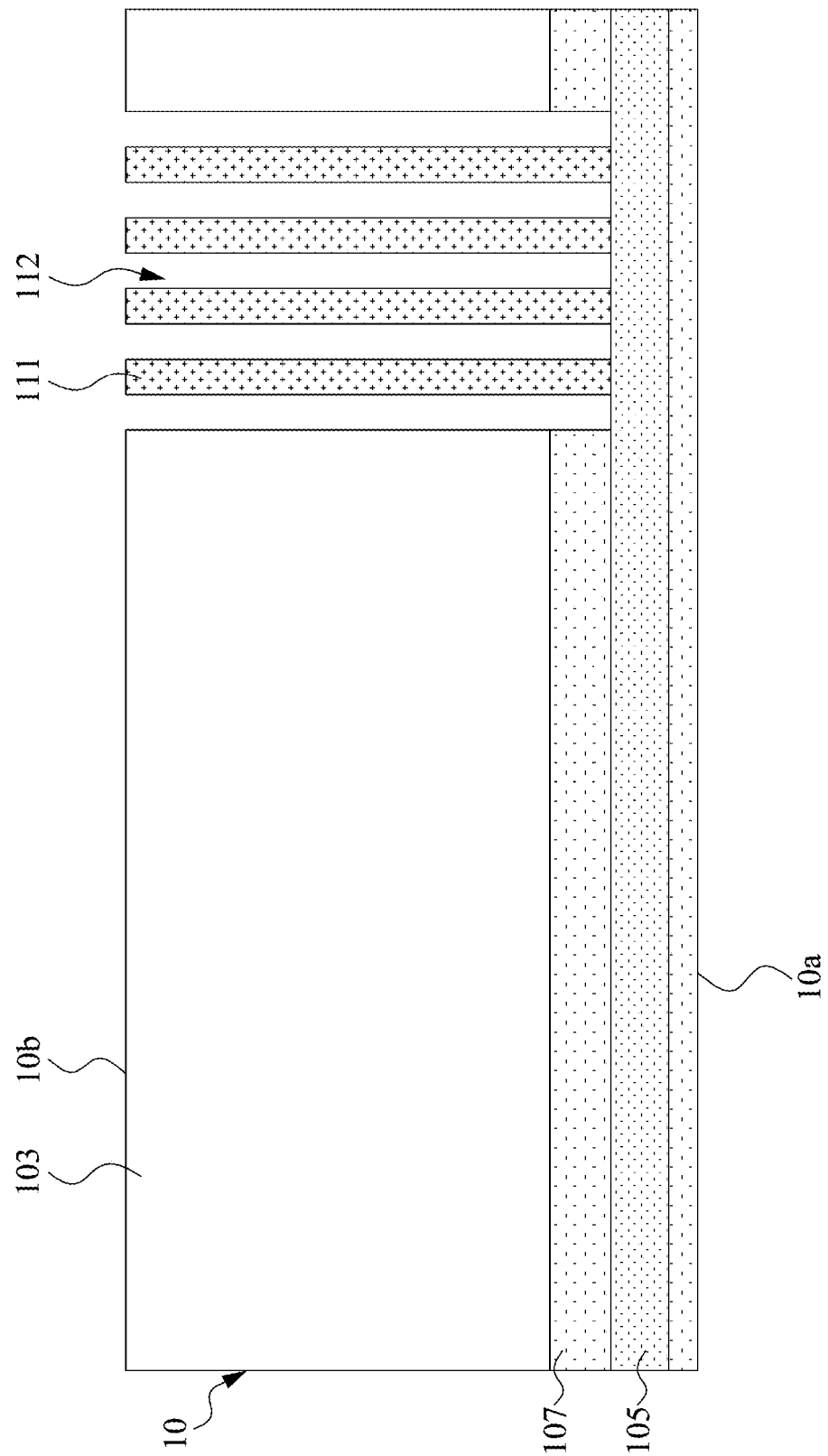
FIG. 11A, FIG. 11B and FIG. 11C illustrate various stages of a method for manufacturing an optoelectronic device in accordance with some embodiments of the present disclosure.
Figure 11B:
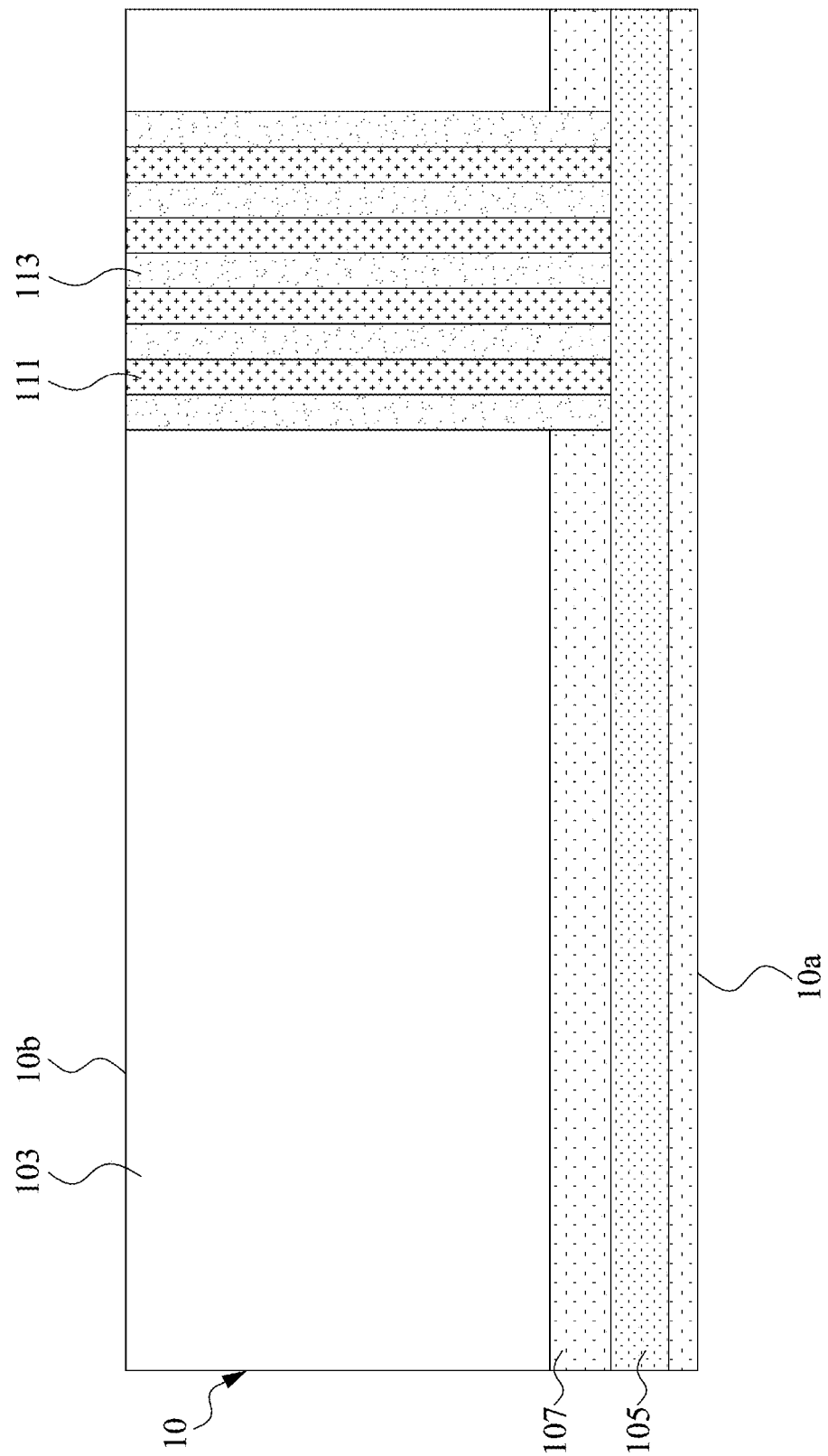
Figure 11C:
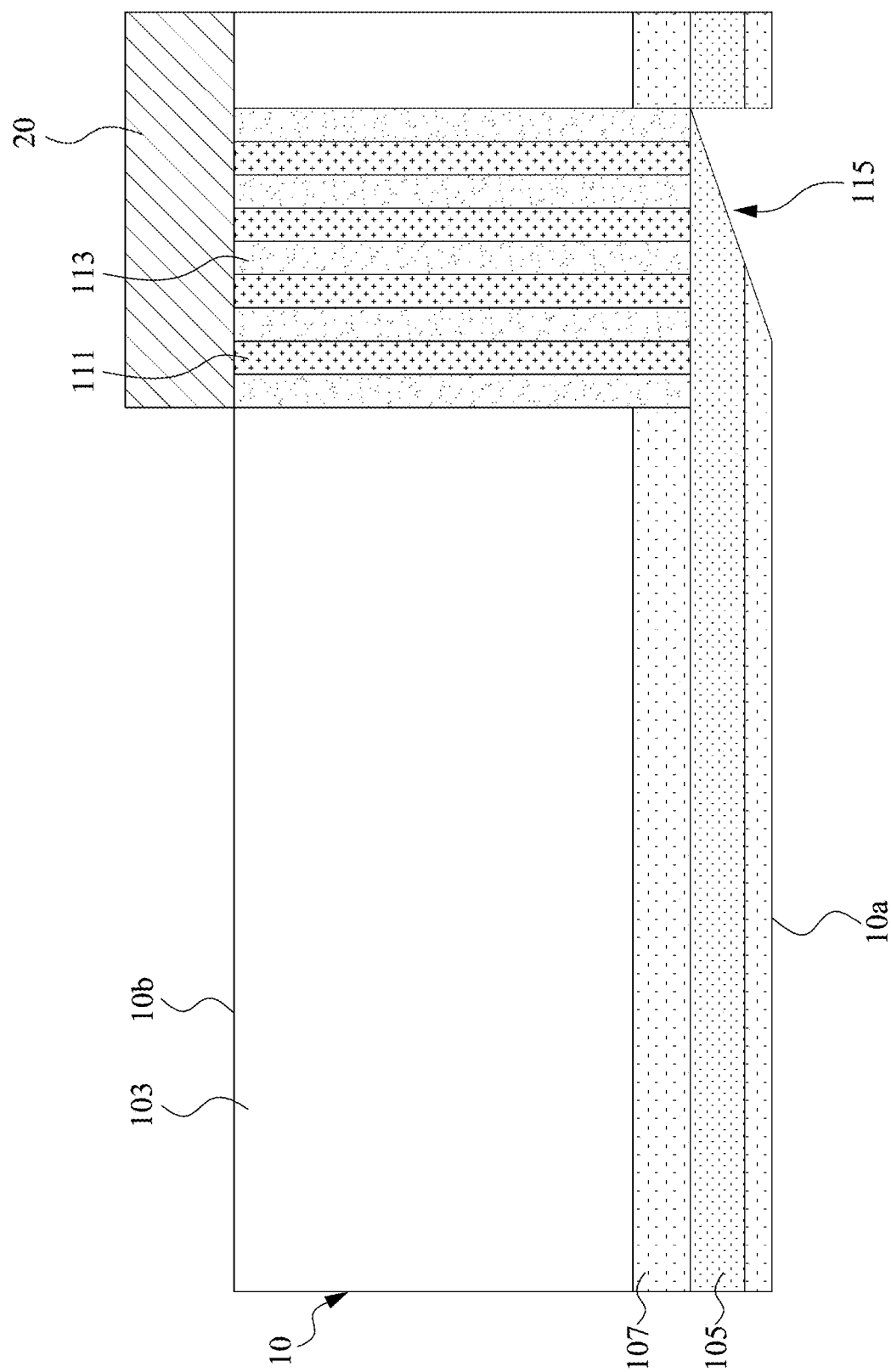

FIG. 11A, FIG. 11B and FIG. 11C illustrate various stages of a method for manufacturing an optoelectronic device in accordance with some embodiments of the present disclosure. As shown in FIG. 11A, a photonic component 10 is provided. The photonic component 10 has a first side 10a and a second side 10b. The photonic component 10 includes a first optical channel 105 disposed along the first side 10a of the photonic component 10. In some embodiments, the photonic component 10 is fabricated, for example, by forming an oxide layer 107 on a substrate 103 (such as a semiconductor substrate, e.g., a silicon substrate or the like), subsequently forming a semiconductor layer 105 (such as a Si layer) on the oxide layer, and subsequently forming another oxide layer 107 on the semiconductor layer 105. A portion of the photonic component 10 is removed from the second side 10b to form at least one pillar 111 surrounded by a trench 112. In some embodiments, the portion of the photonic component 10 is removed by a dry etching process. The at least one pillar 111 is optically coupled to or connected to the first optical channel 105, and functions as the second optical channel 111 as described above. As shown in FIG. 11B, a cladding material is provided in the trench 112. The cladding material fills in the trench 112 to form the second cladding layer 113 as described above. The cladding material has a lower refractive index than a refractive index of the pillar 111.

As shown in FIG. 11C, in some embodiments, the method further includes removing a portion of the first optical channel 105 from the first side 10a to form a recess 115 under the at least one pillar 111. In some embodiments, the portion of the first optical channel 105 is removed by a wet etching process or laser bombardment. In some embodiments, the wet etching process includes using an alkaline etching solution, such as a solution containing potassium hydroxide (KOH) or the like. In some embodiments, the method further includes disposing an optical component 20 on the second surface 10b of the photonic component 10 and optically coupling the optical component 20 to the pillar 111 (i.e., the second optical channel 111) to form the optoelectronic device 1 as shown in FIG. 2.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of the embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be deemed to be "substantially" the same or equal to a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially parallel" can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially perpendicular" can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

As used herein, the singular terms "a," "an," and "the" may include plural referents unless the context clearly dictates otherwise.

While the present disclosure has been described and illustrated with reference to specific embodiments thereof, these descriptions and illustrations are not limiting. It should be understood by those skilled in the art that various changes may be made, and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optoelectronic device, comprising:
   a photonic component including
      an active side and a second side opposite to the active side; and
      a plurality of first optical channels extending from the active side to the second side of the photonic component, wherein the photonic component has a reflective surface recessed from the active side, and projections of the plurality of first optical channels are within the reflective surface;
   wherein a distance between the reflective surface and a bottom end of a first channel of the plurality of first optical channels is different from a distance between the reflective surface and a bottom end of a second channel of the plurality of first optical channels.

2. The optoelectronic device of claim 1, wherein the reflective surface is spaced apart from the plurality of first optical channels.

3. The optoelectronic device of claim 2, further comprising a second optical channel optically coupled to the plurality of first optical channels, wherein the reflective surface is spaced apart from the plurality of first optical channels by a portion of the second optical channel.

4. The optoelectronic device of claim 3, wherein the portion of the second optical channel defines a portion of the reflective surface and directly contacts the plurality of first optical channels.

5. The optoelectronic device of claim 1, wherein the bottom end of the first channel of the plurality of first optical channels is substantially level with an edge of the reflective surface.

6. The optoelectronic device of claim 1, further comprising a second optical channel optically coupled to the plurality of first optical channels, wherein contact interfaces between the plurality of first optical channels and the second optical channel are at a substantially same level.

7. The optoelectronic device of claim 6, further comprising a cladding layer encompassing the plurality of first optical channels, wherein contact interfaces between the cladding layer and the second optical channel are at a substantially same level.

8. An optoelectronic device, comprising:
   a photonic component including
      an active side and a second side opposite to the active side; and
      a plurality of first optical channels extending from the active side to the second side of the photonic component, wherein the photonic component has a reflective surface recessed from the active side, and projections of the plurality of first optical channels are within the reflective surface; and a second optical channel optically coupled to the plurality of first optical channels, wherein the plurality of first optical channels are arranged along an extending direction of the second optical channel.

9. The optoelectronic device of claim 8, wherein the reflective surface comprises a slope surface directly under the plurality of first optical channels.

10. The optoelectronic device of claim 9, wherein an elevation of the slope surface with respect to the second side of the photonic component varies in the extending direction of the second optical channel.

11. An optoelectronic device, comprising:
a photonic component including
an active side and an inactive side opposite to the active side;
a waveguide disposed more adjacent to the active side than the inactive side;
a plurality of optical channels extending from the inactive side to the active side and contacting the waveguide; and
a plurality of contact interfaces between the plurality of optical channels and the waveguide,
wherein the photonic component has a recess recessed from the active side to expose a portion of the waveguide, and
wherein the optical channels overlap the recess and are entirely covered by the waveguide in a cross-sectional view.

12. The optoelectronic device of claim 11, further comprising a first cladding encapsulating the optical channels, wherein the first cladding contacts the waveguide.

13. The optoelectronic device of claim 12, further comprising a second cladding encapsulating the waveguide, wherein the first cladding and the second cladding form an interface that is substantially parallel to the optical channels.

14. The optoelectronic device of claim 11, wherein the waveguide has a notch defined by the recess and exposed from the recess.

15. The optoelectronic device of claim 11, wherein the recess and the active side define a substantially right-triangle shape including a leg not contacting the optical channels and the waveguide.

16. The optoelectronic device of claim 15, wherein the substantially right-triangle shape of the recess has a hypotenuse not contacting the optical channels.

17. The optoelectronic device of claim 11, further comprising an optical component optically coupled to the optical channels, wherein the recess is under the optical component.

18. The optoelectronic device of claim 15, wherein the leg of the substantially right-triangle shape of the recess is substantially level with the active side.

* * * * *